United States Patent
Khandelwal et al.

(10) Patent No.: US 12,217,156 B2
(45) Date of Patent: Feb. 4, 2025

(54) COMPUTING TEMPORAL CONVOLUTION NETWORKS IN REAL TIME

(71) Applicants: Sony Corporation, Tokyo (JP); Sony Corporation of America, New York, NY (US)

(72) Inventors: Piyush Khandelwal, Austin, TX (US); James MacGlashan, Riverside, RI (US); Peter Wurman, Acton, MA (US); Fabrizio Santini, Arlington, MA (US)

(73) Assignee: SONY GROUP CORPORATION, Tokyo (JP)

( * ) Notice: Subject to any disclaimer, the term of this patent is extended or adjusted under 35 U.S.C. 154(b) by 477 days.

(21) Appl. No.: 16/998,761

(22) Filed: Aug. 20, 2020

(65) Prior Publication Data

US 2021/0312258 A1 Oct. 7, 2021

Related U.S. Application Data (60) Provisional application No. 63/003,803, filed on Apr. 1, 2020.

(51) Int. Cl.
*G06N 3/049* (2023.01)
*G06N 3/08* (2023.01)

(52) U.S. Cl.
CPC .............. *G06N 3/049* (2013.01); *G06N 3/08* (2013.01)

(58) Field of Classification Search
CPC ................................. G06N 3/049; G06N 3/08
See application file for complete search history.

(56) References Cited

U.S. PATENT DOCUMENTS

| | | | |
|---|---|---|---|
| 10,241,837 B2 | 3/2019 | Huang et al. | |
| 11,488,009 B2* | 11/2022 | Jaganathan | G06N 3/04 |
| 2003/0233335 A1 | 12/2003 | Mims | |
| 2016/0162543 A1 | 6/2016 | Gustafson et al. | |
| 2017/0148433 A1* | 5/2017 | Catanzaro | G06N 3/084 |
| 2017/0249534 A1 | 8/2017 | Townsend et al. | |
| 2018/0089562 A1 | 3/2018 | Jin et al. | |
| 2018/0322891 A1 | 11/2018 | Van Den Oord | |
| 2019/0114547 A1* | 4/2019 | Jaganathan | G06N 3/0481 |
| 2019/0349287 A1* | 11/2019 | Chandra Sekar Rao | H04L 45/08 |
| 2020/0074274 A1* | 3/2020 | Fan | G06F 17/11 |
| 2020/0234116 A1 | 7/2020 | Valpola | |
| 2020/0245913 A1* | 8/2020 | Dalal | A61B 5/7275 |

(Continued)

OTHER PUBLICATIONS

Lara-Benítez et al. ("Temporal Convolutional Networks Applied to Energy-Related Time Series Forecasting", Mar. 28, 2020) (Year: 2020).*

(Continued)

*Primary Examiner* — Jason B Dunham
*Assistant Examiner* — Huma Waseem
(74) *Attorney, Agent, or Firm* — INNOVATION CAPITAL LAW GROUP, LLP; Vic Lin (57) ABSTRACT

A real-time temporal convolution network (RT-TCN) algorithm reuses the output of prior convolution operations in all layers of the network to minimize the computational requirements and memory footprint of a TCN during real-time evaluation. Further, a TCN trained via the fixed-window view, where the TCN is trained using fixed time splices of the input time series, can be executed in real-time continually using RT-TCN.

11 Claims, 5 Drawing Sheets

(56) References Cited

U.S. PATENT DOCUMENTS

| | | | |
|---|---|---|---|
| 2021/0012191 A1* | 1/2021 | Qiao | G06K 9/6232 |
| 2021/0065891 A1* | 3/2021 | Li | A61B 5/1123 |
| 2021/0390399 A1* | 12/2021 | Georgiou | G06N 3/04 |
| 2022/0139543 A1* | 5/2022 | Dauwels | G06N 3/08 |
| | | | 705/2 |

OTHER PUBLICATIONS

Lee("[Tensorflow] ImplementingTemporal Convolutional Networks, Understanding Tensorflow Part 3"), Apr. 2, 2018 (Year: 2018).*

Eddy, Joseph, "Time Serial Forecasting with Convolutional Neural Networks—a Look at WaveNet", Jun. 2018, https://jeddy92.github.io/JEddy92.github.io/ts_seq2seq_conv/.

International Search Report & Written Opinion dated Jun. 10, 2021 from PCT Application No. PCT/US2021/020903.

Ali Rashid et al: "A Hardware Inference Accelerator for Temporal Convolutional Networks", 2019 IEEE Nordic Circuits and Systems Conference (NORCAS): Norchip and International Symposium of System-on-Chip (SOC), IEEE, Oct. 29, 2019 (Oct. 29, 2019), pp. 1-7, XP033662747.

* cited by examiner

COMPUTING TEMPORAL CONVOLUTION NETWORKS IN REAL TIME

CROSS-REFERENCE TO RELATED APPLICATIONS

This application claims the benefit of priority to U.S. provisional patent application No. 63/003,803, filed Apr. 1, 2020, the contents of which are herein incorporated by reference.

BACKGROUND OF THE INVENTION

1. Field of the Invention

Embodiments of the invention relates generally to machine learning systems and methods. More particularly, the invention relates to systems and methods for computing temporal convolutions in time series data in real-time, where the temporal convolution network needs to be evaluated continually as new data becomes available.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many state-of-the-art solutions to problems operating on time series input, such as human activity recognition and heartbeat detection, now make use of Deep Neural Networks (DNNs). Among different DNN architectures, Temporal Convolution Networks (TCNs) have demonstrated excellent results in both synthetic and real datasets. In TCNs, convolution operations are applied along the time dimension, i.e., data from many different time-steps is convolved together. By building layers of such temporal convolutions, a single output can incorporate a long history of input data. This input history is termed as the receptive field of the TCN.

If the TCN is being executed continually in real time on a device with sufficient compute bandwidth and memory, the last inputs comprising the receptive field of the TCN can simply be stored in memory and some individual convolutions in the TCN can be recomputed redundantly to compute the latest output. However, when resources are limited, executing a trained TCN in real-time can be challenging.

In view of the foregoing, it is clear that there is a need for an algorithm that can meet some or all of the deficiencies of the conventional methods.

SUMMARY OF THE INVENTION

Embodiments of the present invention provide a computerized method of performing deep convolutions over time series data in real time in a temporal convolutional network comprising inputting a first fixed time window of time series data; predicting a first output through a trained deep convolution network; inputting a second fixed time window of time series data; predicting a second output through the trained deep convolution network, wherein a convolution operation that is used to provide the first output and is needed for the second output is not repeated for the prediction of the second output or for a later prediction output.

Embodiments of the present invention further provide a computerized method of performing deep convolutions over time series data in real time in a temporal convolutional network comprising inputting a first fixed time window of time series data; performing a ready convolution operation as soon as all inputs necessary to perform the ready convolution operation are available; retaining input and intermediate values that are necessary for performing a future convolution operation in memory; predicting a first output through a trained deep convolution network; inputting a second fixed time window of time series data; and predicting a second output through the trained deep convolution network, wherein convolution operations needed for the second output that are retained in memory are reused in place of re-performing the convolution operation.

Embodiments of the present invention also provide a non-transitory computer-readable storage medium with an executable program stored thereon, wherein the program instructs one or more processors to perform acts comprising inputting a first fixed time window of time series data; predicting a first output through a trained deep convolution network; inputting a second fixed time window of time series data; predicting a second output through the trained deep convolution network, wherein a convolution operation that is used to provide the first output and is needed for the second output is not repeated for the prediction of the second output or for a later prediction output.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super minicomputer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CS S), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Broadly, embodiments of the present invention provide a real-time (RT) temporal convolution network (TCN) algorithm that reuses the output of prior convolution operations in all layers of the network to minimize the computational requirements and memory footprint of a TCN during real-time evaluation. Further, a TCN trained via the fixed-window view, where the TCN is trained using fixed time splices of the input time series, can be executed in real-time continually using RT-TCN. RT-TCN operates using the following 2 principles: (1) A convolution operation is performed as soon as all inputs necessary to perform it are available. (2) At most, a dilated kernel width of data is required at any given layer to compute the next convolution.

RT-TCN includes two parts: (1) Algorithm 1 is run once to generate buffers to store input and intermediate data. (2)

Algorithm 2 is then supplied the generated buffers and runs continually. Given the latest input, algorithm 2 performs the necessary individual convolutions in all layers, updates the necessary buffers, and returns the network output if it is available. It should be noted that network output may not be available at a time-step if (1) The TCN is not padded and number of input received until the current time is less than the receptive field size; or (2) The output rate is less than the input rate, as in example FIG. 1.

A RT-TCN algorithm for computing TCN outputs is provided that buffers prior convolution outputs to ensure that no individual convolutions in this problem setting are computed redundantly. Specifically, in the exemplary TCN shown in FIG. 1, RT-TCN would only compute the convolution shared between $y_{t-2}$ and $y_t$ once. Furthermore, for some TCN architectures, RT-TCN also reduces the memory footprint compared to the straightforward approach of buffering the last T inputs, where T is the size of the receptive field for the TCN. On devices with limited computing bandwidth and memory, RT-TCN allows executing some TCN architectures which would not be possible otherwise.

Figure 1:
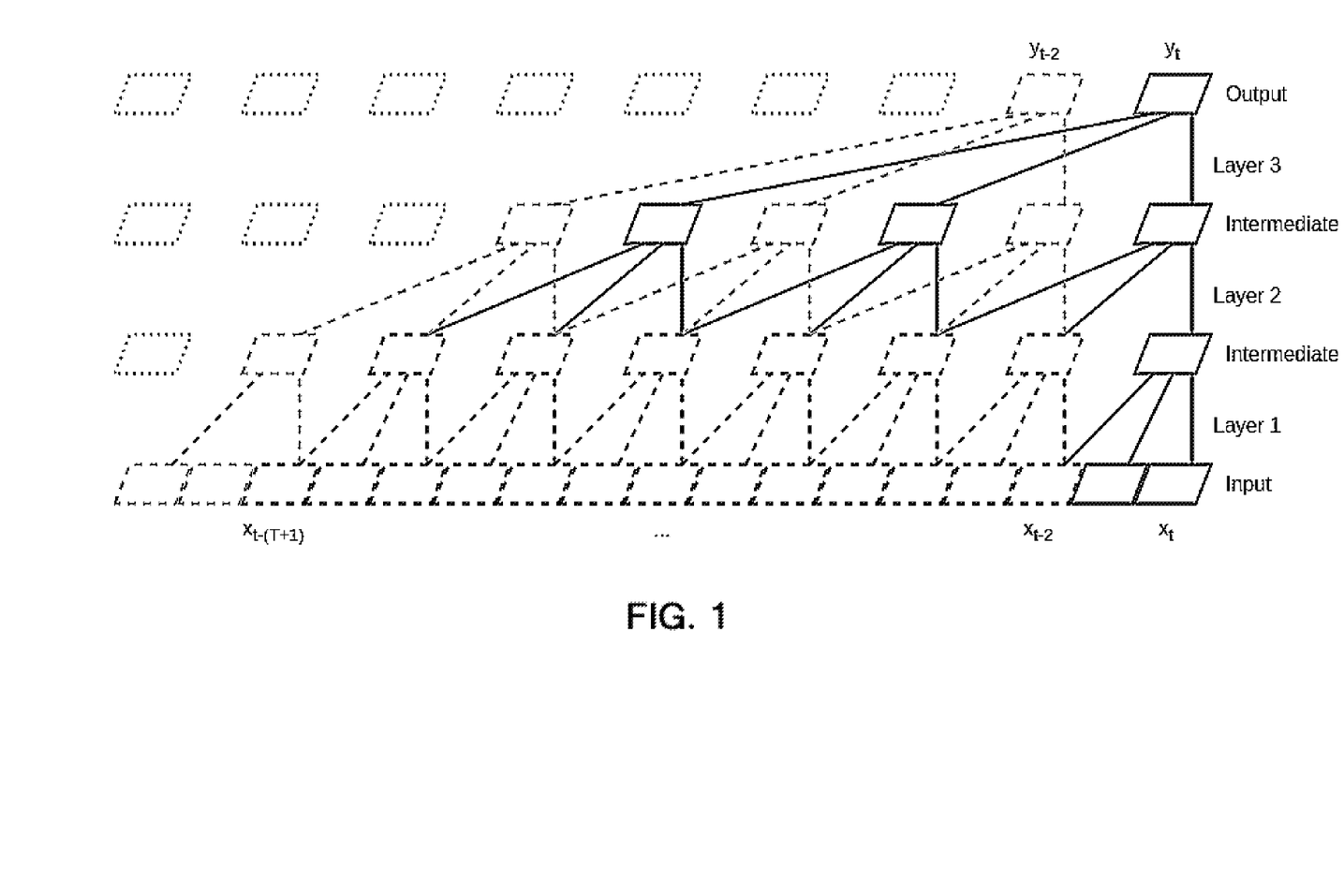
FIG. 1 illustrates an exemplary temporal convolution network with three layers and a receptive field size T=15, where all layers apply a 1-dimensional temporal convolution with a kernel size of 3, layer 1 has a dilation rate of 1 and a stride of 2, layer 2 has a network dilation rate of 1 and a stride of 1, and layer 3 has a network dilation rate of 2 and a stride of 1, where, because layer 1 has a stride of 2, layer 2 has a time dilation rate of 2, and layer 3 has a time dilation rate of 4, where inputs, intermediate convolution outputs and convolutions marked via a dashed line contribute to the output at current time t−2, and those in black contribute to the output at time t.
Figure 2:
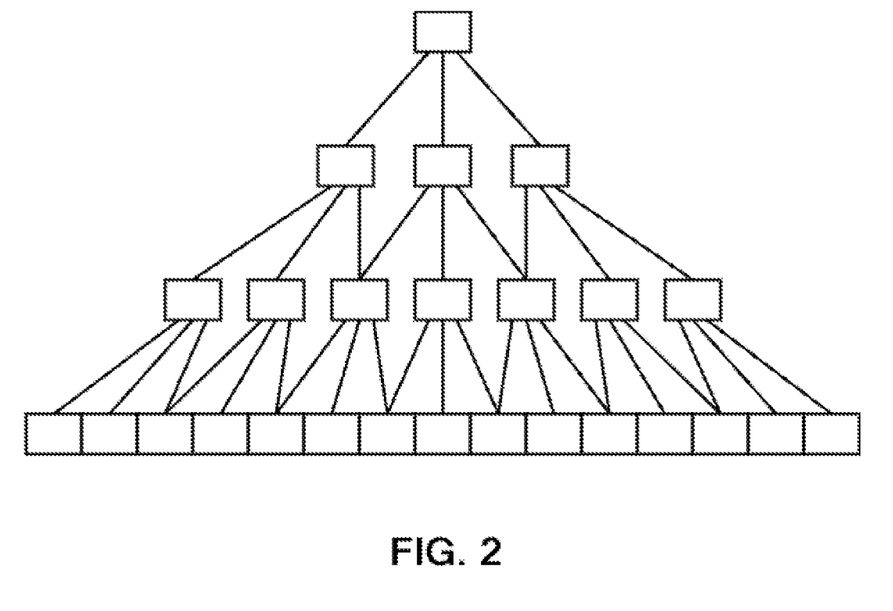
FIG. 2 illustrates a fixed-window view of the temporal convolution network of FIG. 1 while computing a single output.

While a TCN is computed continually in real-time, it may be more convenient to train a TCN from pre-recorded data by backpropagating error on fixed-windows of time series data. In this fixed-window view of the TCN, only one or a few outputs may be generated per fixed-window. For example, in a Reinforcement Learning (RL) setting, where the TCN output may represent the action being taken in the system, it may be convenient to backpropagate error one action/output at a time. When a TCN is trained via a fixed-window view of the input time series (as shown in FIG. 2), and then executed in real-time continually at a specified output rate (as shown in FIG. 1), the network architecture parameters in this continual view may be different from the fixed-window view. A simple conversation methodology is provided from the fixed-window view to the continual view of the TCN, allowing TCNs to be trained in the fixed window representation and then executed continually via RT-TCN.

Typically, convolution networks have been applied in image processing domains where 2-dimensional convolutions are applied across the width and height dimensions of an image. A TCN is a 1-dimensional convolution network where the input data is supplied as a time series. A TCN takes a history of inputs, where the input at each time-step may include different channels (i.e. features) and performs 1-d convolutions on this input data to generate an output. Similar to general convolution networks, a TCN also comprises many different convolution layers, and the depth of the TCN is defined by the number of layers inside it (n). The receptive field comprises the history of inputs that contribute to a single output in the TCN. For the example presented in FIG. 1, the depth of the network is 3, and the receptive field size is 15.

Aspects of the present invention consider TCNs that are made up of causal convolutions. A convolution operation is considered causal if the output of that operation is generated by convolving input data from the current time step or earlier. Causality ensures that a TCN does not depend on future data, and therefore the TCN is suitable for being executed in real-time. For the example presented in FIG. 1, causality is implied by the fact that the last input in the convolution lines up with the output along the x-axis (time dimension).

For any given TCN layer, a convolution operation is defined via the following parameters:

(1) Convolution Kernel Size ($k_s$). Kernel size is the number of time-steps that are convolved together in a single convolution operation. In FIG. 1, all layers have a kernel size of 3.
(2) Convolution Filters ($n_f$)—The number of convolution filters represent the number of independent convolution operations applied over the same input to generate multiple output channels at a single time-step. These output channels are then supplied as input channels to the next layer. At the output layer, the number of filters represent the number of channels in the output per time-step. Number of input channels (c) and number of convolution filters are not represented in FIG. 1 but are used by RT-TCN to describe the size of input and intermediate buffers.
(3) Network Dilation Rate (d). Network Dilation is performed by feeding a history of inputs into a single convolution longer than the kernel size by skipping intermittent inputs. Increasing network dilation at each layer can allow the receptive field size to be increased without increasing the depth of the network or the kernel size at each layer. This feature allows increasing the historical effect of inputs on the output and is useful for domains where a longer history is required to solve the task. In FIG. 1, the network dilation rates are 1, 1, and 2 for the three layers, respectively.
(4) Convolution Stride (s). Convolution kernels in a single layer are applied repeatedly spaced apart by the convolution stride. In FIG. 1, the strides are 2, 1, and 1 for the three layers, respectively. The output rate of a TCN is reduced by a factor $r=\Pi_i^n s_i$ relative to the input rate, where $s_i$ is the stride size for layer i. For example, for the TCN in FIG. 1, the output rate is reduced by a factor of 2×1×1=2. Furthermore, the downsampling caused by convolution strides affects the time dilation of layers that depend on the output. In FIG. 1, the network dilation rates of 1, 1, and 2 are equivalent to time dilation rates of 1, 2, and 4, respectively. Typically, for a given layer i, if stride $s_i \neq 1$, then the network dilation rate $d_i=1$, and vice versa. This constraint ensures that all inputs at the current layer contribute to the output.
(5) Padding (p). In a non-padded TCN, the first prediction will not be available until the number of input samples is equal to the receptive field of the TCN. Alternatively, padding a convolutional layer involves populating the edges of the inputs with default values (typically zero), so that enough input is available to make the first prediction sooner. For example, if the first layer of the TCN in FIG. 1 uses a padding size of p=14, then a prediction for the whole network will be available after the first sample is provided.
(6) Activation Function (g). The activation function of a layer is an element-wise non-linear function applied to the result of the regular convolution operation. As with regular feed-forward neural nets, using an activation function on the intermediate layers allows the network to model complex non-linear relationships. The choices for activation functions in TCN are typically the same used in feed forward networks; e.g., rectified linear units (ReLU), sigmoid, tan h, or exponential linear units (ELU).

Figure 3:
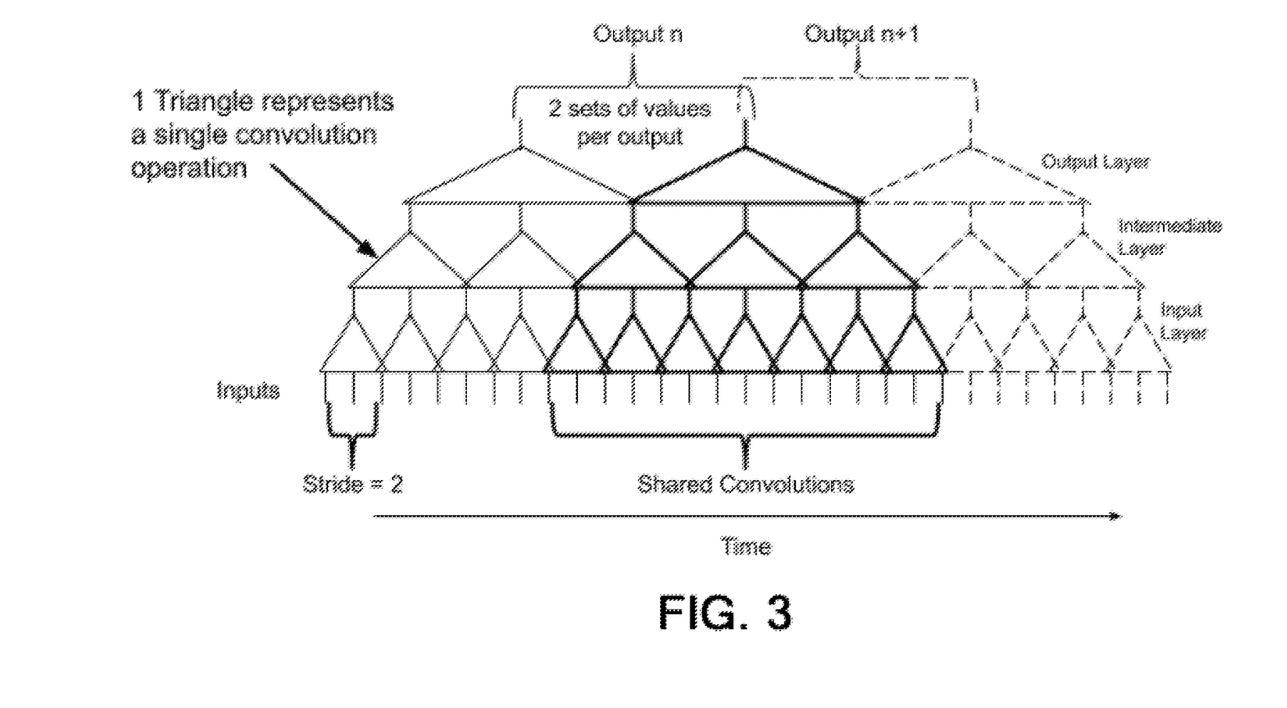
FIG. 3 illustrates individual convolution operations required to process a fixed window to generate two sets of output values per output, where these sets of output values can be used directly or processed further by the system, where solid and bold illustrated convolutions are required for output n and bold and dashed illustrated convolutions are required for output n+1.

As illustrated in FIG. 3, once output n has been generated, 11 of the 18 individual convolution operations necessary to generate output n+1 have already been computed. By keeping track of previous inputs and convolution outputs efficiently, the algorithm presented, according to aspects of the present invention, can eliminate redundant computation.

The three main design goals of this algorithm are (1) A specific convolution operation that uses the same inputs is not performed more than once across multiple input fixed windows; (2) A convolution operation is performed as soon as all inputs necessary to perform it are available; and (3) Input and intermediate values that are necessary for performing a convolution operation in the future are retained in memory.

Figure 4:
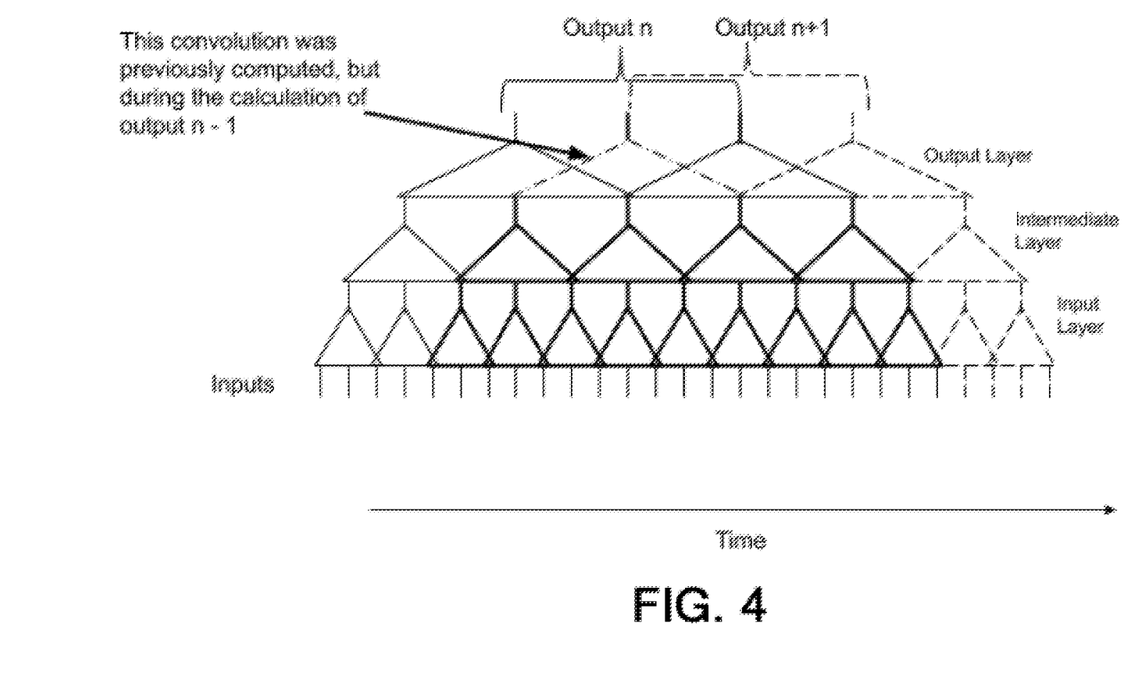
FIG. 4 illustrates a temporal convolution network where output n+1 needs to reuse part of output n−1 to prevent reevaluating convolutions redundantly, where solid and bold illustrated convolutions are required for output n and dot-dashed, bold and dashed illustrated convolutions are required for output n+1.

It should be noted that in some situations, a convolution operation necessary for finalizing outputs for a specific window may have been performed many windows earlier, and not just in the preceding time window. For example, in FIG. 4, the situation is demonstrated where output from the network needs to be computed every 4 samples instead of 8. In this setting, a convolution operation required by output n+1 was performed during the computation of output n−1. Output n+1 needs to reuse part of output n−1 to prevent reevaluating convolutions redundantly. In FIG. 4, solid and bold illustrated convolutions are required for output n and dot-dashed, bold and dashed illustrated convolutions are required for output n+1.

Figure 5:
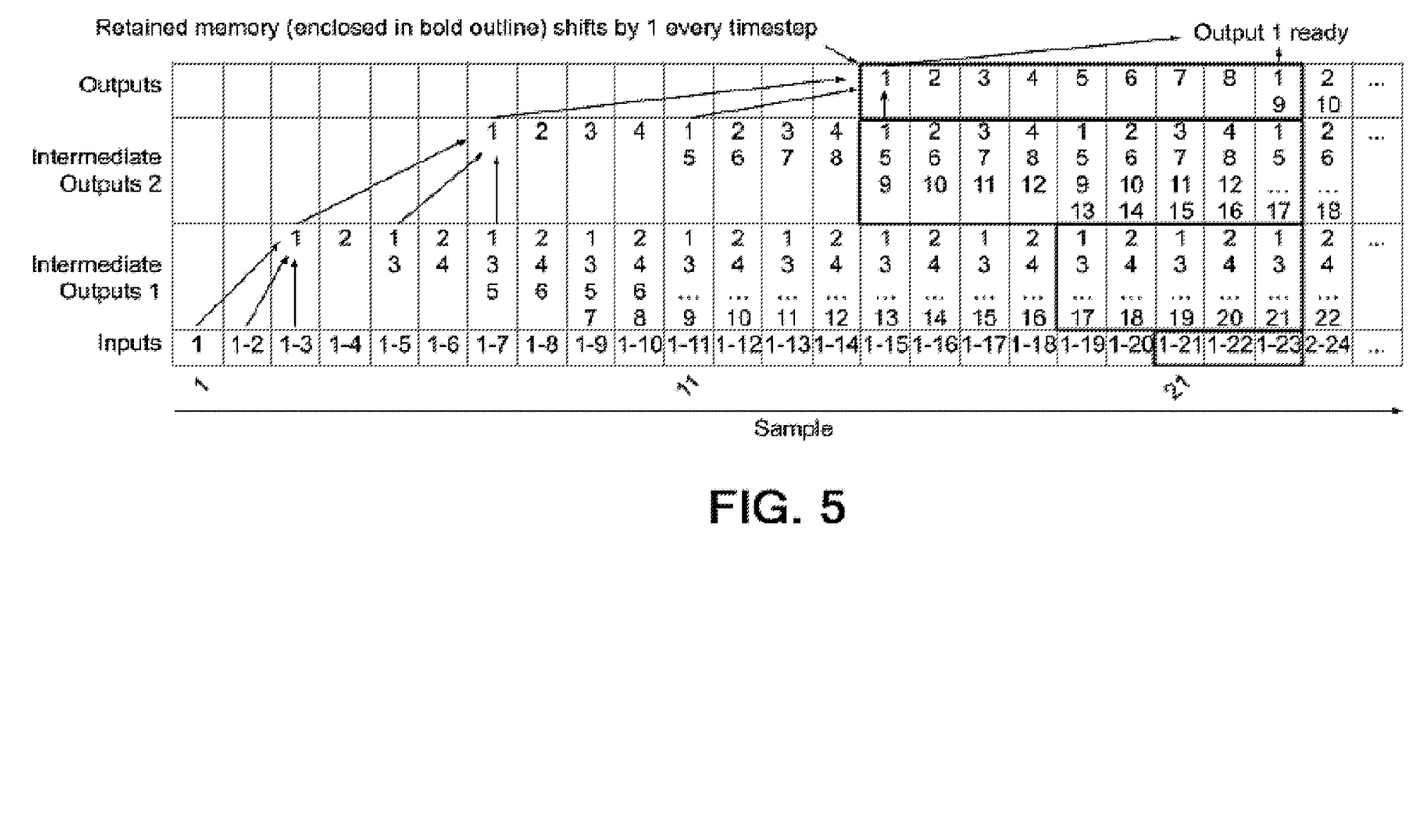
FIG. 5 illustrates an enumeration of which fixed window output uses an input or convolution operation output within the network, where arrows indicate which values are used in a single convolution operation to generate a value for the next layer, and follow the same interleaving as in FIGS. 3 and 4, where previous computations required to compute a value are retained in memory, and these previous computations along with the current computed values are outlined in bold.

Furthermore, even more complex situations exist which require intelligent handling of previous inputs and outputs. FIG. 5 illustrates the same example as before, except that the network now needs to generate a new output every time a new sample arrives (instead of every 4 samples as in FIG. 4). This illustration enumerates whether an input or convolution operation output is required for calculating a specific window output, and which of these previous values need to be retained in memory. Due to a stride of two at each layer, the values required as inputs for a single convolution operation at the next layer become increasingly interleaved as one moves from the input to the output layer. Therefore, in order to reuse previous computations, it is necessary to not only keep track of relevant previous computations, but also to track the interleaving appropriately. The algorithm described herein can correctly compute network outputs for all these described complex situations while ensuring that no convolution operation is performed more than once even across multiple windows.

A first algorithm, discussed below, allows executing a TCN in real-time while eliminating redundant convolutions.

---

Algorithm 1 Generating Data Buffers

---

Input: n ← Network Depth/Number of layers
Input: c ← Number of input channels
Input: f[ ] ← List of number of filters for each layer
Input: k[ ] ← List of kernel sizes for each layer
Input: s[ ] ← List of strides for each layer
Input: d[ ] ← List of dilation rates for each layer
Input: p ← Number of zero-padded inputs
Output: b[ ]; $b_n$[ ] Lists of buffers and initial write heads
1: $n_c$ ← CONCATENATE([c]; f[1 : n − 1])
2: for i = 1 to n do
3:     $k'_s$ ← d[i] · ($k_s$ [i] − 1) + 1
4:     b[i] ← Matrix [$n_c$ [i] [$k'_s$]
5:     $b_h$[i] ← 0
6: end for
7: for j = 1 to p do                    ▷ Apply padding
8:     x ← Vector[c]
9:     FILL (x; 0)                      ▷ Input with all channels set to zero
10:    RT-TCN ($x_t$ = x)                ▷ Apply Algorithm 2
11: end for

---

In Algorithm 1, the number of input channels at each layer is computed on line 1 by combining the number of input channels and number of convolution filters from all but the last layer. On line 3, the dilated kernel size $k'_s$ for layer I is computed, which is then used to initialize a single fixed size buffer b[i] in "CW" layout (channels-width) on line 4. For a TCN, the width "W" in the "CW" layout references the time dimension. On line 5, the write head $b_h$[i] is initialized which identifies the column along "W" where the next input to that buffer should be written. If padding size of p is desired, p zero inputs are fed into Algorithm 2 to populate the buffers appropriately (lines 7-11). Setting p=T−1 ensures that an output is generated on the first input, where T is the receptive field size.

---

Algorithm 2 RT-TCN Algorithm

---

Input: n ← Network Depth/Number of layers
Input: s[ ] ← List of stride for each layer
Input: d[ ] ← List of dilation rates for each layer
Input: $m_w$[ ] ← List of weight matrices for each layer
Input: $m_b$[ ] ← List of bias matrices for each layer
Input: g[ ] ← List of activations for each layer
Input: b[ ] ← List of input buffers for each layer
Input: $b_h$[ ] ← List of buffer write heads for each layer
Input: $x_t$ Next input data point to process at layer 0

```
Algorithm 2 RT-TCN Algorithm

Output: o (Network output, none if not available)
1:  x'₁ ← xₜ
2:  for i = 1 to n do
3:      c ← NUMROWS(b[i])              ▷ Input channel size
4:      for j = 0 to c do                ▷ Fill channels at buffer head
5:          b[i][j][b_h[i]] ← x'ₜ [j]
6:      end for
7:      b_h[i] ← b_h[i] + 1
8:      if b_h[i] = NUMCOLS(b[i]) then   ▷ Full buffer
9:          x'ₜ ← CONV1D(b[i];m_w[i], m_b[i], d[i])
10:         x'ₜ ← g[i]( x'ₜ )            ▷ Apply activation function
11:         b[i] ← SHIFTCOLSLEFT(b[i], s[i])
12:         b_h[i] ← b_h[i] − s[i]
13:         if i = n then
14:             o ← x'ₜ
15:         end if
16:     else
17:         o ← none
18:         break
19:     end if
20: end for
```

Algorithm 2 takes a new single multi-channeled input $x_t$ and passes it through the network while performing individual convolutions as necessary. A new input can trigger at most 1 convolution per layer in the network if the input buffer for that layer becomes full. If a convolution is triggered in the output layer, then a new network output gets generated.

On line 1, the new input sample $x_t$ is put in a temporary buffer $x'_t$. On lines 4 and 5, $x'_t$ is copied into the input buffer for the current layer. If the buffer is full, then a dilated convolution with an activation function is performed on lines 9 and 10 and the result is placed in $x'_t$ be processed as an input for the next layer. The input buffer is emptied by shifting it by the layer stride to eliminate the oldest values along the time dimension "W" (line 11), and the write head is updated (line 12). Finally, if a convolution is performed in the output layer, the temporary buffer $x'_t$ is copied to the output buffer on line 14. If the buffer is not full at any layer, then no output is returned and the algorithm terminates (lines 17 and 18).

To train a TCN, the straight-forward approach is to sample minibatches of whole input sequences with shape "NCW", where N is the minibatch size, C is the input channel size, and W is the "width" of the sequence, and then perform standard stochastic gradient descent optimization on those minibatches. However, there are potential drawbacks to this approach. In particular, data within a sequence may be correlated which means the learning process may be negatively impacted unless a large enough minibatch size is provided. However, if the sequence sizes are large, then it may not be possible in practice to provide large minibatch sizes. Furthermore, if different sequences are different lengths, all sequences have to be padded to the size of the largest sequence in a minibatch.

To address these issues, smaller random subsequences may be extracted and used for training. The smallest reduction that can be used is the size of the receptive field of the network so that only one output is generated. Training a TCN using an input subsequence of size equal to its training data is referred to as the fixed-window view of the TCN and training the TCN with full sequences is referred to as the continual view.

A property of the fixed-window view is that, to train the TCN in a way that is consistent with the continual-view, the architecture of the network may change. To illustrate how, consider the example TCN illustrated in FIG. 1. If only a fixed window length of inputs equivalent to the receptive field size is fed into the network, some of the intermediate convolutions no longer contribute to the single output. If all such irrelevant convolutions are removed, the resulting reduced network architecture is the one illustrated in FIG. 2. In this reduced network, layer 2 now has a stride of 2 instead of 1 and layer 3 has a network dilation rate of 1 instead of 2. Algorithm 3 presents a straightforward approach for pruning unused convolutions to generate a pruned TCN for the fixed window view.

It should be noted that it is not necessary to perform this reduction in the fixed-window view of the TCN. The same stride and network dilation rates specified in the continual-view of the TCN can be used to compute a single network output in the fixed-window view of the TCN. Experiments have shown how pruning the network in the fixed window view can decrease computational requirements when RT-TCN is not used. Popular deep learning libraries, such as tensorflow, perform pruning optimizations automatically during training.

```
Algorithm Continual to Fixed-Window Pruning Algorithm

Input: n ← Network Depth/Number of layers
Input: s[ ] ← Continual-view strides for each layer
Input: d[ ] ← Continual-view dilation rates for each layer
Output: s_fw[ ] ← Fixed-window strides for each layer
Output: d_fw[ ] ← Fixed-window dilation rates for each layer
1:  s_fw[n] ← 1
2:  d_fw[n] ← 1
3:  s_m ← d[n]                          ▷ Stride rate multiplier
4:  for i = n − 1 to 1 do
5:      s_fw[i] ← s[i] · s_m
6:      d_fw[i] ← d[i]
7:      s_m ← GCD(s_fw[i], d_fw[i])
8:      if i ≠ 1 then
9:          s_fw[i] ← s_fw[i] / s_m
10:         d_fw[i] ← d_fw[i] / s_m
11:     end if
12: end for
```

In Algorithm 3, since there is only 1 output, stride at the output layer is insignificant, and since no other input apart from those being operated upon is necessary, dilation can be reduced to 1 by increasing striding at lower layers (lines 1-2). On line 3, the striding multiplier is calculated for lower layers (sm) and begin iterating on lower layers. Using this multiplier, the stride and dilation is calculated for the layer on lines 5-6. To determine if any inputs at this layer are not needed, the Greatest Common Divisor (GCD) of the updated stride and dilation rate is computed. If the GCD is greater than 1, it implies that some inputs at this layer are not needed, and the stride and dilation rate is reduced on lines 9-10, and the stride rate multiplier for lower layers is set to the GCD (line 7). This process is repeated layer-by-layer down to the input layer. The reduction is not performed at the input layer (line 8) to ensure that the fixed window TCN uses input at the same rate specified by the TCN.

Furthermore, the setting where a TCN is trained is considered using a fixed-window representation of the input data, and the trained network is then executed repeatedly in real-time such that an output is desired every r input samples. To use RT-TCN to compute the output, it is necessary to calculate the network strides s and dilation rate d in the continual view of the TCN, so that those parameters can be supplied to RT-TCN.

In Algorithm 4, it is shown how s and d can be calculated from the reduced fixed-window network with strides $s_{fw}[\ ]$ and network dilation rate $d_{fw}[\ ]$.

---

Algorithm 4 Fixed-Window View to Continual View

Input: n ← Network Depth/Number of layers
Input: r ← Desired Output Rate Reduction
Input: $s_{fw}[\ ]$ ← Fixed-window strides for each layer
Input: $d_{fw}[\ ]$ ← Fixed-window dilation rates for each layer
Output: s[ ] ← Continual-view strides for each layer
Output: d[ ] ← Continual-view dilation rates for each layer
1: $m_d$ ← 1                    ▷ Dilation rate multiplier
2: r' ← r                       ▷ Temporary variable
3: for i = 1 to n do
4:     s[i] ← GCD($s_{fw}[i]$, r')
5:     d[i] ← $d_{fw}[i] \cdot m_d$
6:     r' ← r' / s[i]
7:     $m_d$ ← s[i] / $s_{fw}[i] \cdot m_d$
8: end for
9: s[n] ← s[n] · r'

---

In Algorithm 4, a dilation rate multiplier ma is initialized to 1 on line 1. On line 4, we recompute strides for a given layer depending on whether the output needs to be calculated at a different rate than the stride specified by the fixed-window view of the TCN. Next, the dilation rate is increased, as needed, based on the current value of the dilation rate multiplier. Finally, on lines 6 and 7, r is updated to account whether the stride s at that layer accounts for a part of r rate reduction, and then ma is recomputed depending on whether additional convolution outputs were inserted at the current layer, increasing the dilation rate at higher layers. If some portion of r was not accounted by the stride at any layer, it implies that striding exists at the output layer and the stride rate is updated on line 9.

Embodiments of the present invention provide an efficient algorithm for computing deep convolutions over time series data in real-time, where such windows are overlapping over subsequent predictions. The algorithm achieves efficiency by ensuring that no redundant convolution operations are performed. The algorithm is also sufficiently flexible to handle different network architectures, where there are many convolution layers and each convolution layer may have different convolution kernel sizes and strides. This algorithm should enable time series convolutions to be performed efficiently on many different platforms where limited computational resources are available.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A computerized method of performing deep convolutions over time series data in real time in a temporal convolutional network (TCN), comprising:
   training the temporal convolution network via a pruned TCN derived from a fixed-window view of the TCN, wherein the temporal convolution network is trained using fixed time splices of an input time series, wherein the fixed time splices have a size to provide a single output, and wherein unused convolutions of the fixed-window view are removed to generate the pruned TCN;
   calculating network strides and dilation rates for each layer in a continual view of the TCN, where the calculated network strides and the calculated dilation rates are used in real time; and
   executing the fixed-window view trained temporal convolution network in real time by:
      running an algorithm once to generate buffers to store input and intermediate data, the algorithm determining a dilated kernel size each layer of the TCN, which is then used to initialize a single fixed size buffer in channels-width layout wherein a width in the channels-width layout references a time dimension, the algorithm further initializing a write head which identifies a column along the width where a next input to a buffer should be written;

inputting a first fixed time window of time series data;

predicting a first output through the trained temporal convolution network;

inputting a second fixed time window of time series data; and predicting a second output through the trained temporal convolution network, wherein a convolution operation that is used to provide the first output and is needed for the second output is not repeated for the prediction of the second output or for a later prediction output; and a ready convolution operation is performed at a given timestep as soon as all inputs necessary to perform the ready convolution operation are available, even when the ready convolution operation is not used for generating an output at the given timestep.

2. The method of claim 1, further comprising retaining input and intermediate values that are necessary for performing a future convolution operation in memory.

3. The method of claim 1, wherein a single convolution operation is performed only once across multiple fixed time windows of time series data.

4. The method of claim 1, wherein an output of a prior convolution operation is reused as needed in all layers of the temporal convolution network to minimize computational requirements and memory footprint of the temporal convolution network during real-time evaluation thereof.

5. A computerized method of performing deep convolutions over time series data in real time in a temporal convolutional network, comprising:

training the temporal convolution network via a pruned TCN derived from a fixed-window view of the TCN, wherein the temporal convolution network is trained using fixed time splices of an input time series, wherein the fixed time splices have a size to provide a single output, and wherein unused convolutions of the fixed-window view are removed to generate the pruned TCN;

calculating network strides and dilation rates for each layer in a continual view of the TCN, where the calculated network strides and the calculated dilation rates are used in real time; and executing the fixed-window view trained temporal convolution network in real time by:

running an algorithm once to generate buffers to store input and intermediate data, the algorithm determining a dilated kernel size each layer of the TCN, which is then used to initialize a single fixed size buffer in channels-width layout wherein a width in the channels-width layout references a time dimension, the algorithm further initializing a write head which identifies a column along the width where a next input to a buffer should be written;

inputting a first fixed time window of time series data;

performing a ready convolution operation at a given timestep as soon as all inputs necessary to perform the ready convolution operation are available, even when the ready convolution operation is not used for generating an output at the given timestep;

retaining input and intermediate values that are necessary for performing a future convolution operation in memory;

predicting a first output through a trained deep convolution network;

inputting a second fixed time window of time series data; and predicting a second output through the trained deep convolution network, wherein convolution operations needed for the second output that are retained in memory are reused in place of re-performing the convolution operation.

6. The method of claim 5, wherein a single convolution operation is performed only once across multiple fixed time windows of time series data.

7. The method of claim 5, wherein an output of a prior convolution operation is reused as needed in all layers of the temporal convolution network to minimize computational requirements and memory footprint of the temporal convolution network during real-time evaluation thereof.

8. A non-transitory computer-readable storage medium with an executable program stored thereon, wherein the program instructs one or more processors to perform acts comprising:

training the temporal convolution network via a pruned TCN derived from a fixed-window view of the TCN, wherein the temporal convolution network is trained using fixed time splices of an input time series, wherein the fixed time splices have a size to provide a single output, and wherein unused convolutions of the fixed-window view are removed to generate the pruned TCN;

calculating network strides and dilation rates for each layer in a continual view of the TCN, where the calculated network strides and the calculated dilation rates are used in real time; and executing the fixed-window view trained temporal convolution network in real time by:

running an algorithm once to generate buffers to store input and intermediate data, the algorithm determining a dilated kernel size each layer of the TCN, which is then used to initialize a single fixed size buffer in channels-width layout wherein a width in the channels-width layout references a time dimension, the algorithm further initializing a write head which identifies a column along the width where a next input to a buffer should be written;

inputting a first fixed time window of time series data;

predicting a first output through a trained deep convolution network;

inputting a second fixed time window of time series data;

predicting a second output through the trained deep convolution network, wherein a convolution operation that is used to provide the first output and is needed for the second output is not repeated for the prediction of the second output or for a later prediction output; and a ready convolution operation is performed at a given timestep as soon as all inputs necessary to perform the ready convolution operation are available, even when the ready convolution operation is not used for generating an output at the given timestep.

9. The non-transitory computer-readable storage medium with an executable program stored thereon of claim 8, wherein the program instructs one or more processors to perform further acts comprising retaining input and intermediate values that are necessary for performing a future convolution operation in memory.

10. The non-transitory computer-readable storage medium with an executable program stored thereon of claim 8, wherein a single convolution operation is performed only once across multiple fixed time windows of time series data.

11. The non-transitory computer-readable storage medium with an executable program stored thereon of claim 8, wherein an output of a prior convolution operation is reused as needed in all layers of the temporal convolution network to minimize computational requirements and memory footprint of the temporal convolution network during real-time evaluation thereof.

* * * * *